US010486521B2

(12) United States Patent
Haka et al.

(10) Patent No.: US 10,486,521 B2
(45) Date of Patent: Nov. 26, 2019

(54) DISTRIBUTED DRIVETRAIN ARCHITECTURES FOR COMMERCIAL VEHICLES WITH A HYBRID ELECTRIC POWERTRAIN

(71) Applicant: DANA HEAVY VEHICLE SYSTEMS GROUP, LLC, Maumee, OH (US)

(72) Inventors: Raymond J. Haka, Brighton, MI (US); Krishna Kumar, Holland, OH (US); Steven J. Wesolowski, Waterville, OH (US); James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/060,147

(22) PCT Filed: Dec. 5, 2016

(86) PCT No.: PCT/US2016/064901
§ 371 (c)(1),
(2) Date: Jun. 7, 2018

(87) PCT Pub. No.: WO2017/100115
PCT Pub. Date: Jun. 15, 2017

(65) Prior Publication Data
US 2018/0370345 A1    Dec. 27, 2018

Related U.S. Application Data

(60) Provisional application No. 62/314,319, filed on Mar. 28, 2016, provisional application No. 62/264,089, filed on Dec. 7, 2015.

(51) Int. Cl.
*B60K 1/00* (2006.01)
*B60K 6/442* (2007.10)
(Continued)

(52) U.S. Cl.
CPC ............... *B60K 6/442* (2013.01); *B60K 1/02* (2013.01); *B60K 6/387* (2013.01); *B60K 6/547* (2013.01);
(Continued)

(58) Field of Classification Search
CPC ... B60K 6/26; B60K 6/52; B60K 1/02; B60K 6/48; B60K 6/636; B60K 6/387; B60K 6/547
See application file for complete search history.

(56) References Cited

U.S. PATENT DOCUMENTS 3,799,284 A    3/1974   Hender
5,168,946 A   12/1992   Dorgan
(Continued)

FOREIGN PATENT DOCUMENTS

DE    102005062874    7/2007
EP         1232892    8/2002
(Continued)

OTHER PUBLICATIONS

PCT/US2016/064901, International Search Report and Written Opinion dated Mar. 20, 2017, 14 pages.

*Primary Examiner* — Hau V Phan
(74) *Attorney, Agent, or Firm* — Marshall & Melhorn, LLC

(57) ABSTRACT

A hybrid drivetrain (100) is provided. The hybrid drivetrain comprises a power source (102), a first motor generator assembly (104), and an electric axle drive unit (106). The first motor generator assembly includes a primary clutch (114) for drivingly engaging the power source with a first motor-generator (116). The electric axle drive unit comprises at least a second motor generator (140) drivingly engaged with the first motor generator and a pair of wheel assemblies (112). The power source, the first motor genera- (Continued)

tor assembly, and the electric axle drive unit facilitate operating the hybrid drivetrain as a series-parallel hybrid drivetrain in a plurality of operating modes. The hybrid drivetrain meets the exacting needs of commercial vehicles while providing fuel efficiency improvements for vehicles incorporating the hybrid drivetrain.

17 Claims, 3 Drawing Sheets

(51) Int. Cl.
*B60K 6/387* (2007.10)
*B60K 6/547* (2007.10)
*B60K 1/02* (2006.01)
*B60K 17/04* (2006.01)
*B60K 7/00* (2006.01)

(52) U.S. Cl.
CPC .... *B60K 17/046* (2013.01); *B60K 2007/0038* (2013.01); *B60K 2007/0092* (2013.01)

(56) References Cited

U.S. PATENT DOCUMENTS

| | | | |
|---|---|---|---|
| 5,845,731 A | 12/1998 | Buglione | |
| 5,947,855 A * | 9/1999 | Weiss | B60K 6/36 180/65.25 |
| 6,116,363 A * | 9/2000 | Frank | B60K 6/48 180/65.25 |
| 6,295,487 B1 | 9/2001 | Ono | |
| 6,295,847 B1 | 10/2001 | Zeren | |
| 6,644,247 B2 | 11/2003 | Campion | |
| 6,644,427 B2 | 11/2003 | Schulte | |
| 6,740,002 B1 | 5/2004 | Stridsberg | |
| 6,953,408 B2 | 10/2005 | Thompson | |
| 7,174,978 B2 | 2/2007 | Taniguchi | |
| 7,255,187 B2 | 8/2007 | Bell | |
| 7,520,354 B2 | 4/2009 | Morrow | |
| 7,520,534 B2 | 4/2009 | Longchamp | |
| 7,742,852 B1 | 6/2010 | Tang | |
| 8,011,461 B2 | 9/2011 | Rodriguez | |
| 8,453,772 B2 * | 6/2013 | Brown | B60W 20/10 180/65.285 |
| 8,944,194 B2 | 2/2015 | Glaser | |
| 9,162,586 B2 | 10/2015 | Tang | |
| 2003/0205422 A1 | 11/2003 | Morrow | |
| 2004/0050597 A1 | 3/2004 | Ai | |
| 2005/0109549 A1 | 5/2005 | Morrow | |
| 2006/0030450 A1 * | 2/2006 | Kyle | B60K 6/26 477/3 |
| 2006/0037792 A1 * | 2/2006 | Boss | B60K 1/02 180/65.6 |
| 2007/0038340 A1 | 2/2007 | Sekiguchi | |
| 2009/0205422 A1 | 8/2009 | Caron | |
| 2009/0242289 A1 | 10/2009 | Murty | |
| 2009/0321153 A1 | 12/2009 | Boeckenhoff | |
| 2010/0282530 A1 | 11/2010 | Wang | |
| 2011/0120788 A1 | 5/2011 | Wang | |
| 2011/0259657 A1 * | 10/2011 | Fuechtner | B60K 6/52 180/65.21 |
| 2013/0150197 A1 | 6/2013 | Lee | |
| 2014/0116793 A1 | 5/2014 | Pelletier | |
| 2015/0210152 A1 * | 7/2015 | Arkus | B60L 11/1809 180/65.245 |
| 2015/0211616 A1 | 7/2015 | Yang | |

FOREIGN PATENT DOCUMENTS

| | | |
|---|---|---|
| EP | 2574490 | 4/2013 |
| EP | 2574491 | 4/2013 |
| EP | 2705968 | 3/2014 |
| EP | 2902234 | 8/2015 |
| EP | 2927036 | 10/2015 |
| FR | 2746352 | 9/1997 |
| JP | 2005081930 | 3/2005 |

* cited by examiner

US 10,486,521 B2

DISTRIBUTED DRIVETRAIN ARCHITECTURES FOR COMMERCIAL VEHICLES WITH A HYBRID ELECTRIC POWERTRAIN

CLAIM OF PRIORITY

The present application claims the benefit of priority to U.S. Provisional Application No. 62/264,089 filed on Dec. 7, 2015 and U.S. Provisional Application No. 62/314,319 filed on Mar. 28, 2016, which are incorporated herein in their entirety by reference.

FIELD OF THE INVENTION

The present invention relates to drivetrains for commercial vehicles and more particularly to hybrid electric drivetrains for commercial vehicles.

BACKGROUND OF THE INVENTION

Commercial vehicles or trailers having two or more rear axles allow such vehicles to carry greater loads when compared to vehicles and trailers having a single axle. Further, tractive effort and load distribution can be increased in these vehicles.

Hybrid powertrains incorporate a second power source, such as a motor-generator and a battery, that can be used to increase an efficiency of a drivetrain. Currently, few options for hybridized drivetrains for commercial vehicles are available. Because of the unique demands of commercial vehicles, such as the need for a low speed, high torque mode of operation while also having a high speed, low torque mode of operation, many challenges exist in successfully implementing a hybridized drivetrain for use with commercial vehicles. Further, regulations posed by governments increasingly demand fuel efficiency improvements for such vehicles.

It would be advantageous to develop a hybridized drivetrain for commercial vehicles that meets the exacting needs of commercial vehicles while providing fuel efficiency improvements for vehicles incorporating the hybridized drivetrain.

SUMMARY OF THE INVENTION

Presently provided by the invention, a hybridized drivetrain for commercial vehicles that meets the exacting needs of commercial vehicles while providing fuel efficiency improvements for vehicles incorporating the hybridized drivetrain, has surprisingly been discovered.

In one embodiment, the present invention is directed to a hybrid drivetrain. The hybrid drivetrain comprises a power source, a first motor generator assembly, and an electric axle drive unit. The first motor generator assembly includes a primary clutch for drivingly engaging the power source with a first motor-generator. The electric axle drive unit comprises at least a second motor generator drivingly engaged with the first motor generator and a pair of wheel assemblies. The power source, the first motor generator assembly, and the electric axle drive unit facilitate operating the hybrid drivetrain as a series-parallel hybrid drivetrain in a plurality of operating modes.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 1:
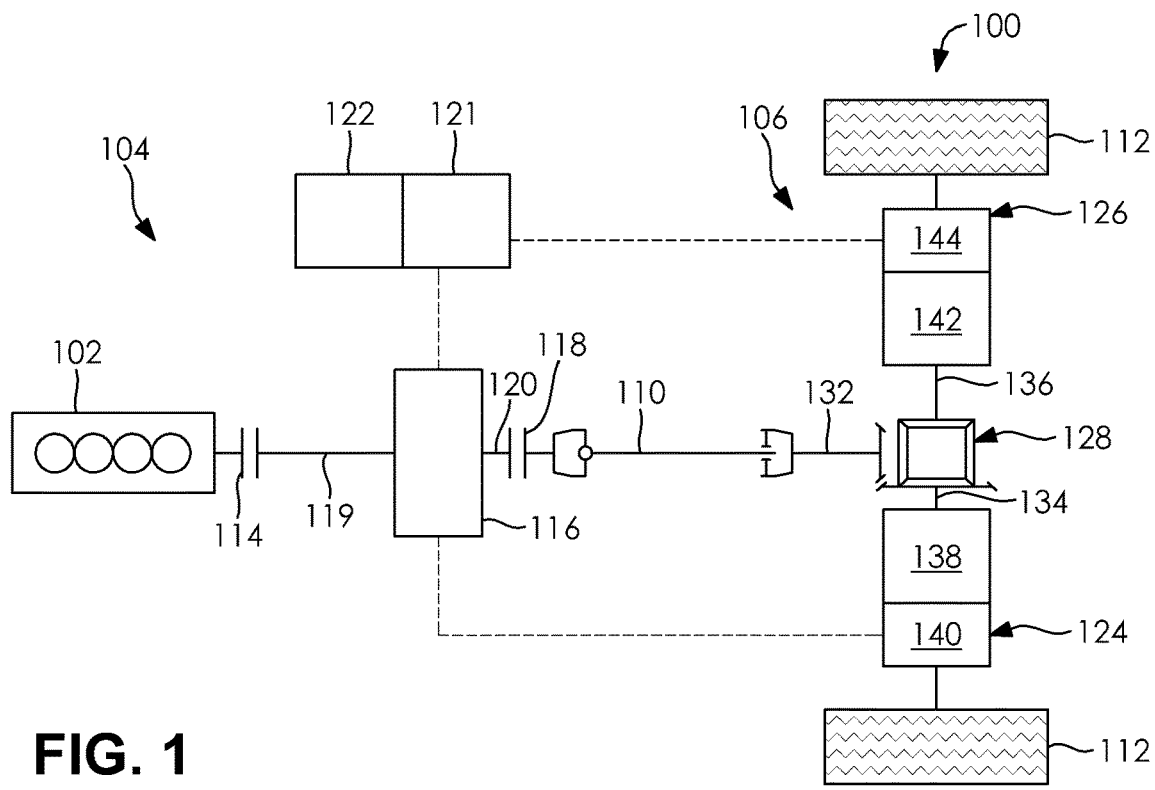
FIG. 1 is a schematic style view of a hybrid drivetrain according to a first embodiment of the invention.

FIG. 1 is a schematic style view of a hybrid drivetrain 100 for a vehicle (not shown) according to a first embodiment of the invention. The hybrid drivetrain 100 includes a power source 102, a first motor generator assembly 104, and an electric axle drive unit 106. The power source 102 is drivingly engaged with a portion of the first motor generator assembly 104. The electric axle drive unit 106 is drivingly engaged with the first motor generator assembly 104 through a drive shaft 110, for example. The electric axle drive unit 106 is also drivingly engaged with a pair of wheel assemblies 112. The hybrid drivetrain 100 is a series-parallel hybrid drivetrain, and may be operated in a plurality of operating modes. While not shown, it is understood that the hybrid drivetrain 100 may be operated with an unpowered tag or pusher axle to form a tandem axle hybrid driveline.

The first motor generator assembly 104 includes a primary clutch 114, a first motor-generator 116, and a secondary clutch 118. A portion of the primary clutch 114 acts as an input 119 for the first motor generator assembly 104. A portion of the secondary clutch 118 acts as an output 120 for the first motor generator assembly 104. The first motor-generator 116 is in electrical communication with a controller 121 and a battery 122.

The primary clutch 114 is a clutch which can be variably engaged, such as a plate or cone style clutch. The primary clutch 114 allows the power source 102 to drivingly engage the first motor-generator 116 when the primary clutch 114 is at least partially engaged. The primary clutch 114 is also in communication with the controller 121. In response to communication from the controller 121 to the primary clutch 114, the primary clutch 114 is placed in a disengaged, partially engaged, or engaged position.

The first motor-generator 116 is in driving engagement with the primary clutch 114 and the secondary clutch 118. The first motor generator 116 is in electrical communication with the controller 121 and the battery 122. It is understood that the first motor-generator 116, or any of the other motor generators described herein, may be incorporated into a gearbox, transmission, or other driveline component of the hybrid drivetrain 100. Depending on an electrical control of the first motor generator 116 using the controller 121, the first motor generator 116 may apply force to or retard the input 119 or the output 120 of the first motor generator assembly 104. Force is applied by the first motor generator 116 by converting electrical energy stored in the battery 122 into kinetic energy by rotating the input 119 or the output 120 and any components drivingly engaged therewith. When the input 119 or the output 120 is retarded in response to electrical control by the controller 121, the first motor-generator 116 generates electrical energy, which may be stored in the battery 122.

The secondary clutch 118 is a clutch which can be variably engaged, such as a plate or cone style clutch. The secondary clutch 118 allows the first motor-generator 116 to drivingly engage the electric axle drive unit 106 when the secondary clutch 118 is at least partially engaged. The secondary clutch 118 is also in communication with the controller 121. In response to communication from the controller 121 to the secondary clutch 118, the secondary clutch 118 is placed in a disengaged, partially engaged, or engaged position.

The controller 121 is in electrical communication with at least the primary clutch 114, the secondary clutch 118, the battery 122, the first motor-generator 116, a second motor generator assembly 124 forming a portion of the electric axle drive unit 106, and a third motor generator assembly 126 forming a portion of the electric axle drive unit 106. It is understood that the controller 121 may also be in communication with other components of the hybrid drivetrain 100 (such as the power source 102) or the vehicle. The controller 121 controls an operating mode of the hybrid drivetrain 100 or the vehicle by placing the primary clutch 114 and the secondary clutch 118 in an engaged or disengaged position and by controlling the first motor-generator 116, the second motor generator assembly 124, and the third motor generator assembly 126 to apply force to or retard portions of the hybrid drivetrain 100 each are respectively drivingly engaged with.

The battery 122 is a rechargeable, electrochemical energy storage device in electrical communication with the controller 121, the first motor-generator 116, the second motor generator assembly 124, and the third motor generator assembly 126. It is understood that the battery 122 may also be in electrical communication with other components of the hybrid drivetrain 100 or the vehicle to supply power thereto. In response to the controller 121 adjusting an operating mode of the hybrid drivetrain 100, the battery 122 may be charged or discharged.

The electric axle drive unit 106 includes a differential assembly 128, the second motor generator assembly 124, and the third motor generator assembly 126. The differential assembly 128 is in driving engagement with the secondary clutch 118 (through a drive shaft 110), the second motor generator assembly 124, and the third motor generator assembly 126. The second motor generator assembly 124 is in driving engagement with the differential assembly 128 and one of the wheel assemblies 112. The third motor generator assembly 126 is in driving engagement with the differential assembly 128 and a remaining one of the wheel assemblies 112. The second motor-generator assembly 124 is in electrical communication with the controller 121 and the battery 122. The third motor-generator assembly 126 is in electrical communication with the controller 121 and the battery 122.

The differential assembly 128 is disposed within an axle housing (not shown). The differential assembly 128 is in driving engagement with an axle drive pinion 132 and the motor generator assemblies 124, 126. At least one bearing (not shown), which may be a thrust roller bearing, is in contact with a portion of the differential assembly 128 to enable it to rotate within the axle housing. The differential assembly 128 is a conventional differential assembly comprising a ring gear, differential housing, drive pinions, and side gears as known in the art. The side gears of the differential assembly 128 are respectively drivingly engaged with a first axle output shaft 134 and the second axle output shaft 136. The ring gear of the differential assembly 128 is drivingly engaged with the axle drive pinion 132 to facilitate driving engagement between the first motor generator 116 and the differential assembly 128 through the secondary clutch and the drive shaft 110.

The second motor generator assembly 124 is in driving engagement with the first axle output shaft 134 and one of the wheel assemblies 112. The second motor generator assembly 124 includes a gear box portion 138 and a motor generator portion 140. The gear box portion 138 is a ratio adjusting device, such as but not limited to an epicyclic gearset or a gear train used to increase or decrease a drive ratio between the first axle output shaft 134 and the wheel assembly 112.

The motor generator portion 140 is in electrical communication with the controller 121 and the battery 122. As shown, the motor generator portion 140 forms a portion of the second motor generator assembly 124, however, it is understood that the motor generator portion 140, or any of the other motor generators described herein, may be incorporated into another portion of the electric axle drive unit 106 or another driveline component of the hybrid drivetrain 100. Depending on an electrical control of the motor generator portion 140 using the controller 121, the motor generator portion 140 may apply force to propel or retard the first axle output shaft 134 and the associated wheel assembly 112. Force is applied by the motor generator portion 140 by converting electrical energy stored in the battery 122 into kinetic energy by rotating the wheel assembly 112 and any components drivingly engaged therewith. When the first axle output shaft 134 and the associated wheel assembly 112 is retarded in response to electrical control by the controller 121, the motor generator portion 140 generates electrical energy, which may be stored in the battery 122.

The third motor generator assembly 126 is in driving engagement with the second axle output shaft 136 and a remaining of the wheel assemblies 112. The third motor generator assembly 126 includes a gear box portion 142 and a motor generator portion 144. The gear box portion 142 is a ratio adjusting device, such as but not limited to an epicyclic gearset or a gear train used to increase or decrease a drive ratio between the second axle output shaft 136 and the wheel assembly 112.

The motor generator portion 144 is in electrical communication with the controller 121 and the battery 122. As shown, the motor generator portion 144 forms a portion of the second motor generator assembly 126, however, it is understood that the motor generator portion 144, or any of the other motor generators described herein, may be incorporated into another portion of the electric axle drive unit 106 or another driveline component of the hybrid drivetrain 100. Depending on an electrical control of the motor generator portion 144 using the controller 121, the motor generator portion 144 may apply force to propel or retard the second axle output shaft 136 and the associated wheel assembly 112. Force is applied by the motor generator portion 144 by converting electrical energy stored in the battery 122 into kinetic energy by rotating the wheel assembly 112 and any components drivingly engaged therewith. When the second axle output shaft 136 and the associated wheel assembly 112 is retarded in response to electrical control by the controller 121, the motor generator portion 144 generates electrical energy, which may be stored in the battery 122.

In use, the hybrid drivetrain 100 may be operated in a plurality of operating modes. The hybrid drivetrain 100 may be operated in an all-electric mode, a hybrid mode, a regeneration/braking mode, a charging mode, and a direct drive mode. Further, it is understood that the operating modes described hereinbelow with respect to the hybrid drivetrain 100 may be adapted for use with the other hybrid drivetrains described herein, utilizing the architecture of each to operate in the all-electric mode (where applicable), the hybrid mode, the regeneration/braking mode, the charging mode, and the direct drive mode.

In the all-electric mode, the primary clutch 114 is placed in a disengaged position, and the battery 122 serves as the only power source for the hybrid drivetrain 100 for the vehicle. In the all-electric mode, the electric axle drive unit 106, the first motor generator 116, or both the electric axle drive unit 106 and the first motor generator 116 may apply force to the hybrid drivetrain 100, causing rotation of at least one of the wheel assemblies 112, propelling the vehicle. When only the electric axle drive unit 106 is used in the all-electric mode, the secondary clutch 118 is placed in a disengaged position, and the motor generator portions 140, 144 of the electric axle drive unit 106, in response to communication with the controller 121, apply force to the hybrid drivetrain 100 to propel the vehicle. When only the first motor generator 116 is used in the all-electric mode, the secondary clutch 118 is placed in an engaged position, and the first motor generator 116, in response to communication with the controller 121, applies a driving force to the hybrid drivetrain 100 through the drive shaft 110, the differential assembly 128, and the motor generator assemblies 124, 126 (which remain in an unpowered state). When both the first motor generator 116 and the electric axle drive unit 106 are used in the all-electric mode, the secondary clutch 118 is placed in an engaged position and the first motor generator 116 and the electric axle drive unit 106, in response to communication with the controller 121, apply force to the hybrid drivetrain 100 to propel the vehicle.

In the hybrid mode, the primary clutch 114 and the secondary clutch 118 are placed in an engaged position, and the battery 122 and the power source 102 serve as a combined power source for the hybrid drivetrain 100 for the vehicle. In the hybrid mode, the electric axle drive unit 106, the first motor generator 116, or both the electric axle drive unit 106 and the first motor generator 116, in addition to the power source 102, may apply force to the hybrid drivetrain 100 to propel the vehicle. When the electric axle drive unit 106 and the first motor generator 116 are used in the hybrid mode, the secondary clutch 118 and the primary clutch 114 are placed in an engaged position, and the electric axle drive unit 106, the first motor generator 116, and the power source 102, in response to communication with the controller 121, apply force to the hybrid drivetrain 100 to propel the vehicle. When the electric axle drive unit 106 is used in the hybrid mode, the secondary clutch 118 and the primary clutch 114 are placed in an engaged position, and the electric axle drive unit 106 and the power source 102 (applying force through the first motor generator 116), in response to communication with the controller 121, apply force to the hybrid drivetrain 100 to propel the vehicle. When the first motor generator 116 is used in the hybrid mode, the secondary clutch 118 and the primary clutch 114 are placed in an engaged position, and the first motor generator 116 and the power source 102 (applying force through the first motor generator 116), in response to communication with the controller 121, apply force (through the electric axle drive unit 106) to the hybrid drivetrain 100 to propel the vehicle.

In the regeneration/braking mode, the first motor generator 116, the electric axle drive unit 106, or both the first motor generator 116 and the electric axle drive unit 106 are used to retard the hybrid drivetrain 100 for the vehicle to facilitate capturing kinetic energy of the vehicle as electrical power to be stored in the battery 122. The regeneration/braking mode may be used to assist a conventional braking system or may be used to regulate a speed of the vehicle when descending an incline. When the first motor generator 116 is used in the regeneration/braking mode, the secondary clutch 118 is placed in an engaged position and the primary clutch 114 may be placed in a disengaged condition (it is understood that engine braking using the power source 102 may or may not be used in addition to the regeneration/braking mode), and the first motor generator 116 retards the hybrid drivetrain 100 to capture kinetic energy as electrical power. When the electric axle drive unit 106 is used in the regeneration/braking mode, the secondary clutch 118 may be placed in a disengaged position and the primary clutch 114 may be placed in a disengaged condition (it is understood that engine braking using the power source 102 may or may not be used in addition to the regeneration/braking mode), and the electric axle drive unit 106 retards the hybrid drivetrain 100 to capture kinetic energy as electrical power. When both the electric axle drive unit 106 and the first motor generator 116 are used in the regeneration/braking mode, the secondary clutch 118 is placed in an engaged position and the primary clutch 114 may be placed in a disengaged condition (it is understood that engine braking using the power source 102 may or may not be used in addition to the regeneration/braking mode), and both the electric axle drive unit 106 and the first motor generator 116 retard the hybrid drivetrain 100 to capture kinetic energy as electrical power.

In the charging mode, the power source 102 and the first motor generator 116 are used to charge the battery 122. It is understood that the charging mode may be utilized when the vehicle is stationary or when the electric axle drive unit 106 is propelling the vehicle in the all-electric mode. In the charging mode, the secondary clutch 118 is placed in a disengaged position and the primary clutch 114 is placed in an engaged condition, allowing the power source 102 and the first motor generator 116 to charge the battery 122 while the electric axle drive unit 106 is used to propel the vehicle, if desired.

In the direct drive mode, neither the first motor generator 116 nor the electric axle drive unit 106 are used to propel the vehicle. It is understood that the direct drive mode may be utilized when a charge level of the battery 122 does not permit operation in the all-electric or hybrid modes. In the direct drive mode, the secondary clutch 118 and the primary clutch 114 are placed in an engaged position, and the power source 102 in response to communication with the controller 121, applies a driving force (through the first motor generator 116 and the electric axle drive unit 106) to the hybrid drivetrain 100 to propel the vehicle.

Figure 2:
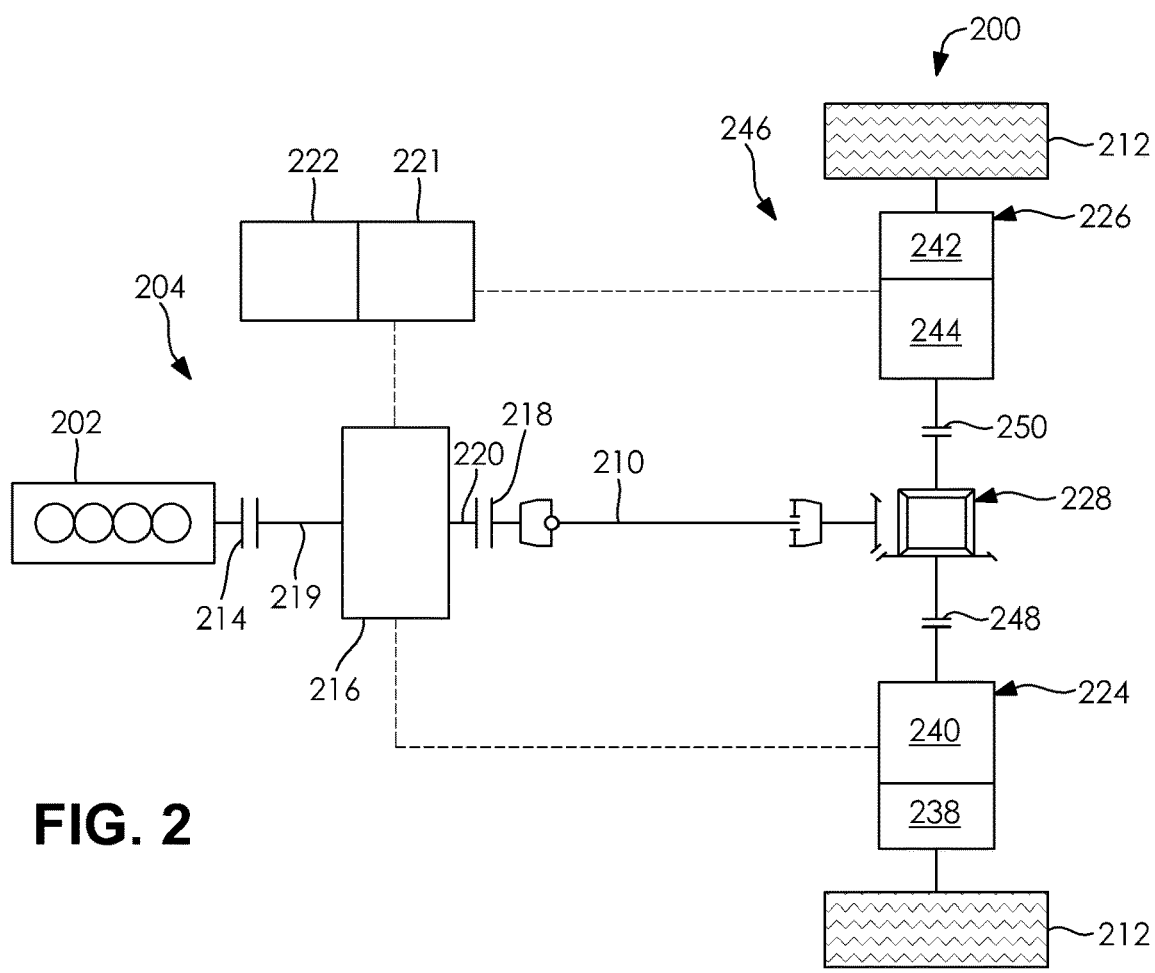
FIG. 2 is a schematic style view of a hybrid drivetrain according to another embodiment of the invention.

FIG. 2 illustrates a hybrid drivetrain 200 according to another embodiment of the invention. The hybrid drivetrain 200 is a variation of the hybrid drivetrain 100, and has similar features thereto. The variation of the invention shown in FIG. 2 includes similar components to the hybrid drivetrain 100. Similar features of the variation shown in FIG. 2 are numbered similarly in series. Different and additional features of the variation shown in FIG. 2 are described hereinbelow and can be appreciated by one skilled in the art in view of FIG. 1 and the other embodiments of the invention illustrated and described in this disclosure.

FIG. 2 is a schematic style view of the hybrid drivetrain 200 for a vehicle (not shown) according to another embodiment of the invention. The hybrid drivetrain 200 includes a power source 202, a first motor generator assembly 204, and an electric axle drive unit 246. The power source 202 is drivingly engaged with a portion of the first motor generator assembly 204. The electric axle drive unit 246 is drivingly engaged with the first motor generator assembly 204 through a drive shaft 210, for example. The electric axle drive unit 246 is also drivingly engaged with a pair of wheel assemblies 212. The hybrid drivetrain 200 is a series-parallel hybrid drivetrain, and may be operated in a plurality of operating modes as described hereinabove. While not shown, it is understood that the hybrid drivetrain 200 may be operated with an unpowered tag or pusher axle to form a tandem axle hybrid driveline.

The electric axle drive unit 246 includes a differential assembly 228, a second motor generator assembly 224, a third motor generator assembly 226, a first axle clutch 248, and a second axle clutch 250. The differential assembly 228 is in driving engagement with the secondary clutch 218 (through the drive shaft 210), the second motor generator assembly 224 through the first axle clutch 248, and the third motor generator assembly 226 through the second axle clutch 250. The second motor generator assembly 224 is in driving engagement with the differential assembly 228 through the first axle clutch 248 and one of the wheel assemblies 212. The third motor generator assembly 226 is in driving engagement with the differential assembly 228 through the second axle clutch 250 and a remaining one of the wheel assemblies 212. The second motor-generator assembly 224 is in electrical communication with the controller 221 and the battery 222. The third motor-generator assembly 226 is in electrical communication with the controller 221 and the battery 222.

The first axle clutch 248 is a clutch which can placed in at least an engaged and a disengaged position, such as a dog clutch. Further, it is understood that the first axle clutch 248 may be a clutch that can be variably engaged, such as a plate or cone style clutch. The first axle clutch 248 allows the differential assembly 228 to drivingly engage the second motor generator assembly 224 when the first axle clutch 248 is at least partially engaged. The first axle clutch 248 is also in communication with the controller 221. In response to communication from the controller 221 to the first axle clutch 248, the first axle clutch 248 is placed in at least an engaged and a disengaged position.

The second axle clutch 250 is a clutch which can placed in at least an engaged and a disengaged position, such as a dog clutch. Further, it is understood that the second axle clutch 250 may be a clutch that can be variably engaged, such as a plate or cone style clutch. The second axle clutch 250 allows the differential assembly 228 to drivingly engage the third motor generator assembly 226 when the second axle clutch 250 is at least partially engaged. The second axle clutch 250 is also in communication with the controller 221. In response to communication from the controller 221 to the second axle clutch 250, the second axle clutch 250 is placed in at least an engaged and a disengaged position.

Through the use of the axle clutches 248, 250, the hybrid drivetrain 200 benefits from decreased parasitic losses by being able to disconnect the differential assembly 228 and the drive shaft 210 from the motor generator assemblies 224, 226. This benefit may occur when the hybrid drivetrain 200 is operated in the all-electric mode, the regeneration/braking mode, and the charging mode.

Figure 3:
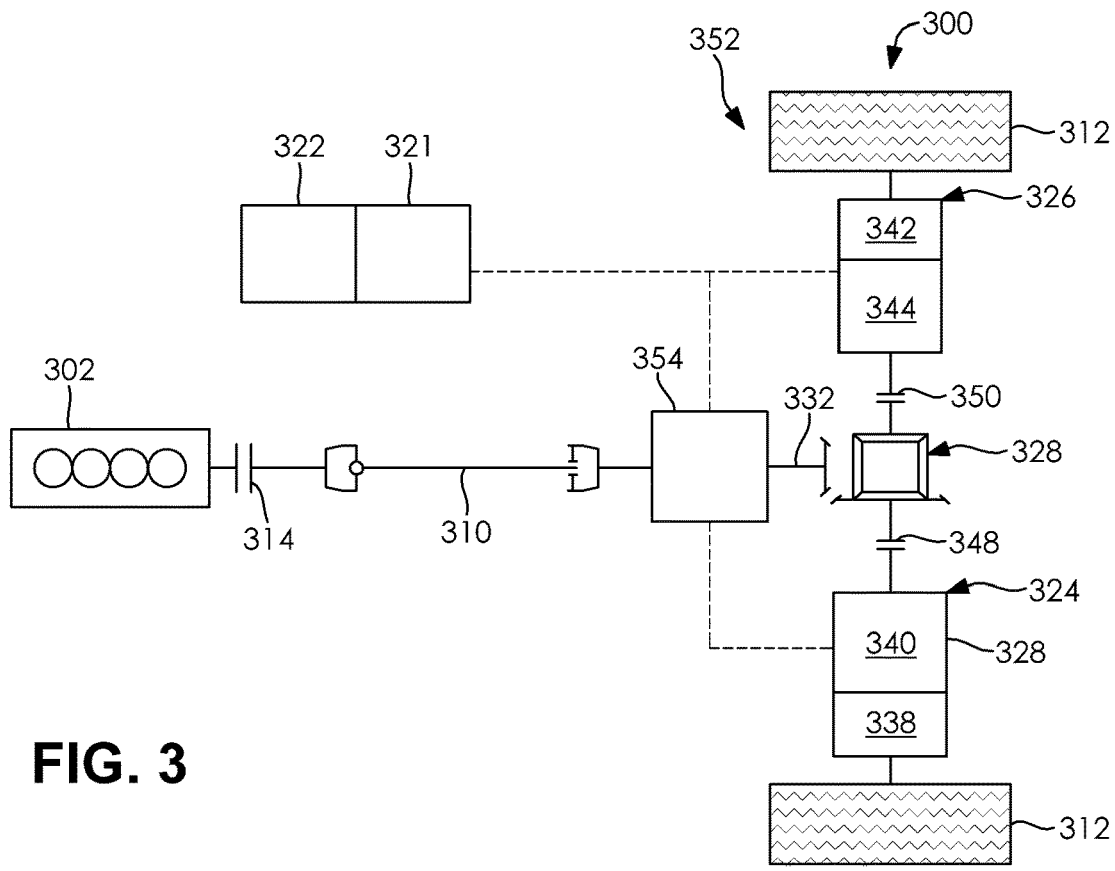
FIG. 3 is a schematic style view of a hybrid drivetrain according to another embodiment of the invention.

FIG. 3 illustrates a hybrid drivetrain 300 according to another embodiment of the invention. The hybrid drivetrain 300 is a variation of the hybrid drivetrain 100, and has similar features thereto. The variation of the invention shown in FIG. 3 includes similar components to the hybrid drivetrain 100. Similar features of the variation shown in FIG. 3 are numbered similarly in series. Different and additional features of the variation shown in FIG. 3 are described hereinbelow and can be appreciated by one skilled in the art in view of FIG. 1 and the other embodiments of the invention illustrated and described in this disclosure.

FIG. 3 is a schematic style view of the hybrid drivetrain 300 for a vehicle (not shown) according to another embodiment of the invention. The hybrid drivetrain 300 includes a power source 302 and an electric axle drive unit 352. The power source 302 is drivingly engaged with the electric axle drive unit 352 through a drive shaft 310, for example. The electric axle drive unit 352 is also drivingly engaged with a pair of wheel assemblies 312. The hybrid drivetrain 300 is a series-parallel hybrid drivetrain, and may be operated in a plurality of operating modes as described hereinabove. While not shown, it is understood that the hybrid drivetrain 300 may be operated with an unpowered tag or pusher axle to form a tandem axle hybrid driveline.

The electric axle drive unit 352 includes a first motor generator 354, a differential assembly 328, a second motor generator assembly 324, a third motor generator assembly 326, a first axle clutch 348, and a second axle clutch 350. The first motor generator 354 is in driving engagement with the primary clutch 314 (through the drive shaft 310) and the differential assembly 328. The second motor generator assembly 324 is in driving engagement with the differential assembly 328 through the first axle clutch 348 and one of the wheel assemblies 312. The third motor generator assembly 326 is in driving engagement with the differential assembly 328 through the second axle clutch 350 and a remaining one of the wheel assemblies 312. The first motor generator 354, the second motor-generator assembly 324, and the third motor-generator assembly 326 are in electrical communication with the controller 321 and the battery 322. All of the components of the electric axle drive unit 352 may be at least partially disposed within an axle housing (not shown).

Through the placement of the first motor generator 354 as a portion of the electric axle drive unit 352, the hybrid drivetrain 300 benefits through the use of conventional driveline components between the power source 302 and the electric axle drive unit 352 and a localization of the first motor generator 354, the second motor-generator assembly 324, and the third motor-generator assembly 326 within the electric axle drive unit 352, facilitating assembly and service of the hybrid drivetrain 300. Further, the hybrid drivetrain 300 benefits from decreased parasitic losses by being able to disconnect the differential assembly 328, the first motor generator 354, and the drive shaft 310 from the motor generator assemblies 324, 326. This benefit may occur when the hybrid drivetrain 300 is operated in the all-electric mode and the regeneration/braking mode.

Figure 4:
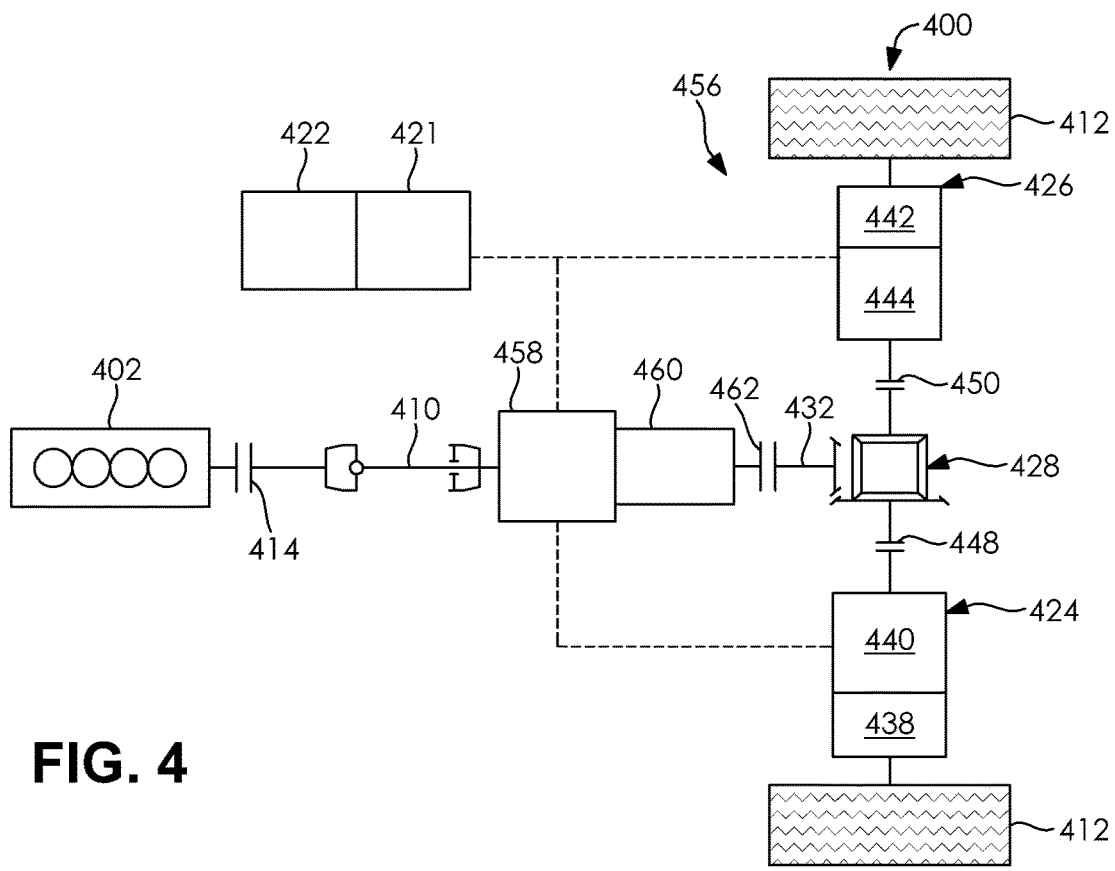
FIG. 4 is a schematic style view of a hybrid drivetrain according to another embodiment of the invention.

FIG. 4 illustrates a hybrid drivetrain 400 according to another embodiment of the invention. The hybrid drivetrain 400 is a variation of the hybrid drivetrain 100, and has similar features thereto. The variation of the invention shown in FIG. 4 includes similar components to the hybrid drivetrain 100. Similar features of the variation shown in FIG. 4 are numbered similarly in series. Different and additional features of the variation shown in FIG. 4 are described hereinbelow and can be appreciated by one skilled in the art in view of FIG. 1 and the other embodiments of the invention illustrated and described in this disclosure.

FIG. 4 is a schematic style view of the hybrid drivetrain 400 for a vehicle (not shown) according to another embodiment of the invention. The hybrid drivetrain 400 includes a power source 402 and an electric axle drive unit 456. The power source 402 is drivingly engaged with the electric axle drive unit 456 through a drive shaft 410, for example. The electric axle drive unit 456 is also drivingly engaged with a pair of wheel assemblies 412. The hybrid drivetrain 400 is a series-parallel hybrid drivetrain, and may be operated in a plurality of operating modes as described hereinabove. While not shown, it is understood that the hybrid drivetrain 400 may be operated with an unpowered tag or pusher axle to form a tandem axle hybrid driveline.

The electric axle drive unit 456 includes a first motor generator 458, a gearbox 460, a secondary clutch 462, a differential assembly 428, a second motor generator assembly 424, a third motor generator assembly 426, a first axle clutch 448, and a second axle clutch 450. The first motor generator 454 is in driving engagement with the primary clutch 414 (through the drive shaft 410) and the gearbox 460. The gearbox 460 is in driving engagement with the secondary clutch 462, and the secondary clutch 462 is in driving engagement with the differential assembly 428. The second motor generator assembly 424 is in driving engagement with the differential assembly 428 through the first axle clutch 448 and one of the wheel assemblies 412. The third motor generator assembly 426 is in driving engagement with the differential assembly 428 through the second axle clutch 450 and a remaining one of the wheel assemblies 412. The first motor generator 454, the second motor-generator assembly 424, and the third motor-generator assembly 426 are in electrical communication with the controller 421 and the battery 422. All of the components of the electric axle drive unit 456 may be at least partially disposed within an axle housing (not shown).

The first motor generator 458 is in electrical communication with the controller 421 and the battery 422. As shown, the first motor generator 458 forms a portion of electric axle drive unit 456, however, it is understood that the first motor generator 458, or any of the other motor generators described herein, may be incorporated into another driveline component of the hybrid drivetrain 400. Depending on an electrical control of the first motor generator 458 using the controller 421, the first motor generator 458 may apply force to propel or retard the differential assembly 428 and the associated wheel assemblies 412. Force is applied by the first motor generator 458 by converting electrical energy stored in the battery 422 into kinetic energy by rotating the wheel assemblies 412 and any components drivingly engaged therewith. When the differential assembly 428 and the associated wheel assemblies 412 are retarded in response to electrical control by the controller 421, the first motor generator 458 generates electrical energy, which may be stored in the battery 422.

The gearbox 460 is a drive ratio adjusting device comprising an assembly of gears, clutches, actuators and other components typically used in transmissions. As a non-limiting example, the gearbox 460 may be a fixed ratio gearbox and may eliminate a need for a transmission typically used with the power source 402. The gearbox 460 is drivingly engaged with a portion of the first motor generator 458 and a portion of the secondary clutch 462. The gearbox 460 is in communication with the controller 421. In response to communication from the controller 421, a drive ratio of the gearbox 460 is adjusted.

The secondary clutch 462 is a clutch which can placed in at least an engaged and a disengaged position, such as a dog clutch. Further, it is understood that the secondary clutch 462 may be a clutch that can be variably engaged, such as a plate or cone style clutch. The secondary clutch 462 allows the differential assembly 428 to drivingly engage the gearbox 460 when the secondary clutch 462 is at least partially engaged. The secondary clutch 462 is also in communication with the controller 421. In response to communication from the controller 421 to the secondary clutch 462, the secondary clutch 462 is placed in at least an engaged and a disengaged position.

Through the placement of the first motor generator 458 and the gearbox 460 as a portion of the electric axle drive unit 456, the hybrid drivetrain 400 benefits through the use of conventional driveline components between the power source 402 and the electric axle drive unit 456 and a localization of the first motor generator 458, the second motor-generator assembly 424, and the third motor-generator assembly 426 within the electric axle drive unit 456, facilitating assembly and service of the hybrid drivetrain 400. Further, the hybrid drivetrain 400 benefits from decreased parasitic losses by being able to disconnect the differential assembly 428, the first motor generator 458, the gearbox 460, and the drive shaft 410 from the motor generator assemblies 424, 426. This benefit may occur when the hybrid drivetrain 400 is operated in the all-electric mode and the regeneration/braking mode.

Figure 5:
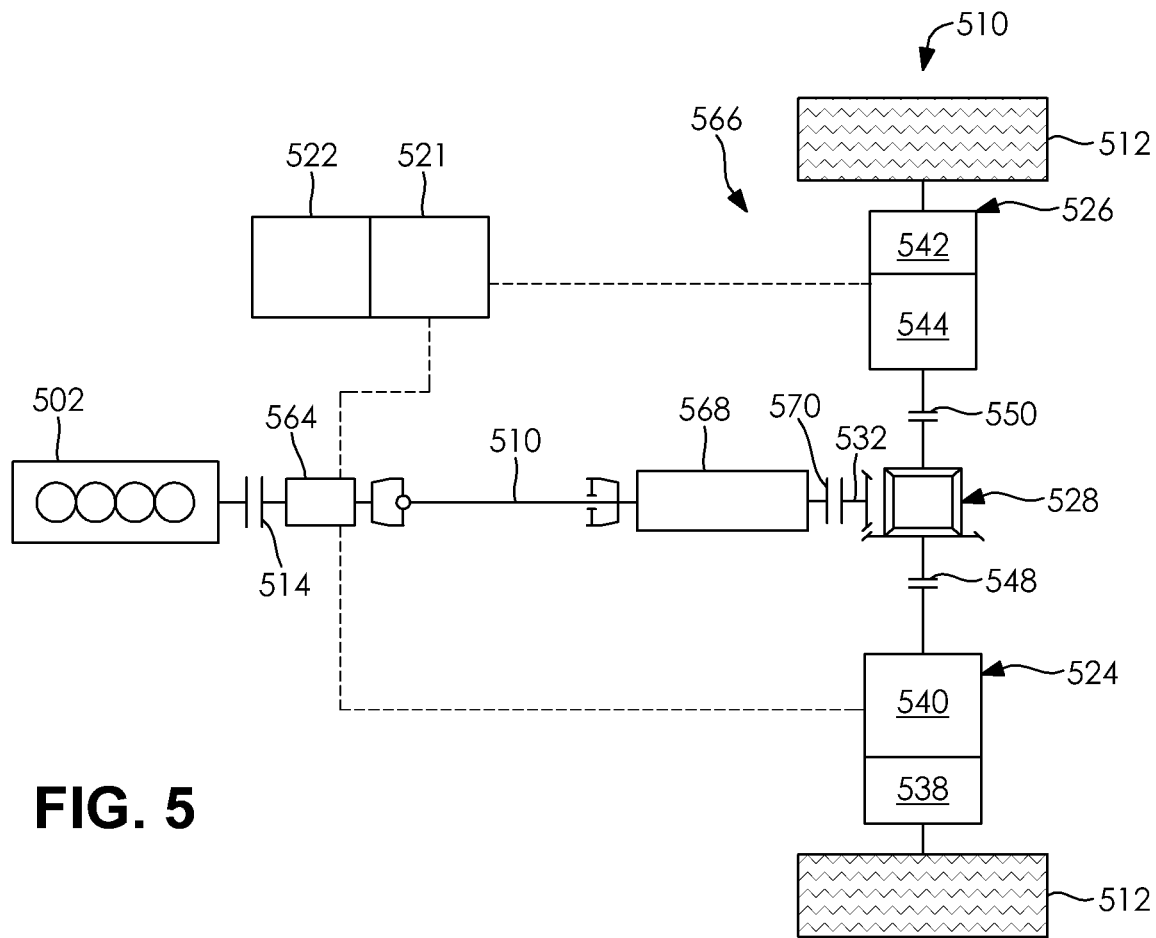
FIG. 5 is a schematic style view of a hybrid drivetrain according to another embodiment of the invention.

FIG. 5 illustrates a hybrid drivetrain 500 according to another embodiment of the invention. The hybrid drivetrain 500 is a variation of the hybrid drivetrain 100, and has similar features thereto. The variation of the invention shown in FIG. 5 includes similar components to the hybrid drivetrain 100. Similar features of the variation shown in FIG. 5 are numbered similarly in series. Different and additional features of the variation shown in FIG. 5 are described hereinbelow and can be appreciated by one skilled in the art in view of FIG. 1 and the other embodiments of the invention illustrated and described in this disclosure.

FIG. 5 is a schematic style view of the hybrid drivetrain 1100 for a vehicle (not shown) according to another embodiment of the invention. The hybrid drivetrain 500 includes a power source 502, a primary clutch 514, a first motor generator 564, and an electric axle drive unit 566. The power source 502 is drivingly engaged with the electric axle drive unit 566 through the first motor generator 564 and a drive shaft 510, for example. The electric axle drive unit 566 is also drivingly engaged with a pair of wheel assemblies 512. The hybrid drivetrain 500 is a series-parallel hybrid drivetrain, and may be operated in a plurality of operating modes as described hereinabove. While not shown, it is understood that the hybrid drivetrain 500 may be operated with an unpowered tag or pusher axle to form a tandem axle hybrid driveline.

The primary clutch 514 is a clutch which can be variably engaged, such as a plate or cone style clutch. The primary clutch 514 allows the power source 502 to drivingly engage the first motor-generator 564 when the primary clutch 514 is at least partially engaged. The primary clutch 514 is also in communication with the controller 521. In response to communication from the controller 521 to the primary clutch 514, the primary clutch 514 is placed in a disengaged, partially engaged, or engaged position.

The first motor generator 564 is in driving engagement with a primary clutch 514 and the drive shaft 510. The first motor generator 564 is in electrical communication with the controller 521 and the battery 522. It is understood that the first motor-generator 564, or any of the other motor generators described herein, may be incorporated into a gearbox, transmission, or other driveline component of the hybrid drivetrain 500. Depending on an electrical control of the first motor generator 564 using the controller 521, the first motor generator 564 may apply force to or retard the drive shaft 510. Force is applied by the first motor generator 564 by converting electrical energy stored in the battery 522 into kinetic energy by rotating the drive shaft 510 and any components drivingly engaged therewith. When the drive shaft 510 is retarded in response to electrical control by the controller 521, the first motor-generator 564 generates electrical energy, which may be stored in the battery 522.

The electric axle drive unit 566 includes a gearbox 568, a secondary clutch 570, a differential assembly 528, a second motor generator assembly 524, a third motor generator assembly 526, a first axle clutch 548, and a second axle clutch 550. The gearbox 568 is in driving engagement with the first motor generator 564 (through the drive shaft 510). The gearbox 568 is in driving engagement with the secondary clutch 570, and the secondary clutch 570 is in driving engagement with the differential assembly 528. The second motor generator assembly 524 is in driving engagement with the differential assembly 528 through the first axle clutch 548 and one of the wheel assemblies 512. The third motor generator assembly 526 is in driving engagement with the differential assembly 528 through the second axle clutch 550 and a remaining one of the wheel assemblies 512. The first motor generator 564, the second motor-generator assembly 524, and the third motor-generator assembly 526 are in electrical communication with the controller 521 and the battery 522. All of the components of the electric axle drive unit 566 may be at least partially disposed within an axle housing (not shown).

The gearbox 568 is a drive ratio adjusting device comprising an assembly of gears, clutches, actuators and other components typically used in transmissions. As a non-limiting example, the gearbox 568 may be a fixed ratio gearbox and may eliminate a need for a transmission typically used with the power source 502. The gearbox 568 is drivingly engaged with the first motor generator 564 (through the drive shaft 510) and a portion of the secondary clutch 570. The gearbox 568 is in communication with the controller 521. In response to communication from the controller 521, a drive ratio of the gearbox 568 is adjusted.

The secondary clutch 570 is a clutch which can placed in at least an engaged and a disengaged position, such as a dog clutch. Further, it is understood that the secondary clutch 570 may be a clutch that can be variably engaged, such as a plate or cone style clutch. The secondary clutch 570 allows the differential assembly 528 to drivingly engage the gearbox 568 when the secondary clutch 570 is at least partially engaged. The secondary clutch 570 is also in communication with the controller 521. In response to communication from the controller 521 to the secondary clutch 570, the secondary clutch 570 is placed in at least an engaged and a disengaged position.

Through the placement of the gearbox 568 as a portion of the electric axle drive unit 566, the hybrid drivetrain 500 benefits from decreased parasitic losses by being able to disconnect the differential assembly 528, the first motor generator 564, the gearbox 568, and the drive shaft 510 from the motor generator assemblies 524, 526. This benefit may occur when the hybrid drivetrain 500 is operated in the all-electric mode and the regeneration/braking mode.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. A hybrid drivetrain, comprising:
    a power source;
    a first motor generator assembly including a primary clutch and a first motor-generator, the primary clutch drivingly engaged with the power source and the first motor generator; and
    an electric axle drive unit comprising at least a second motor generator, the second motor generator drivingly engaged with the first motor generator and a pair of wheel assemblies, a differential assembly, a first axle clutch, and a second axle clutch, wherein the differential assembly is in driving engagement with the first axle clutch and the second axle clutch, wherein the first axle clutch is drivingly connected to a first wheel assembly, wherein the second axle clutch is drivingly connected to a second wheel assembly, and wherein the power source, the first motor generator assembly, and the electric axle drive unit facilitate operating the hybrid drivetrain as a series-parallel hybrid drivetrain in a plurality of operating modes.

2. The hybrid drivetrain according to claim 1, further comprising a battery and a controller, wherein the battery and the controller are each in electrical communication with the first motor generator and the second motor generator.

3. The hybrid drivetrain according to claim 2, wherein the first motor generator assembly further comprises a secondary clutch drivingly engaged with the first motor generator and the electric axle drive unit, the controller is in further electrical communication with the primary clutch and the secondary clutch, and control of the power source, the primary clutch, the first motor generator assembly, the secondary clutch, and the electric axle drive unit facilitate operating the hybrid drivetrain in an all-electric mode, a hybrid mode, a regeneration/braking mode, a charging mode, and a direct drive mode.

4. The hybrid drivetrain according to claim 1, wherein the electric axle drive unit further comprises a third motor generator drivingly engaged with the first motor generator and the pair of wheel assemblies.

5. The hybrid drivetrain according to claim 1, wherein depending on an electrical control of the first motor-generator, the first motor-generator applies a driving force to or retards an input or an output thereof.

6. The hybrid drivetrain according to claim 1, wherein depending on an electrical control of the second motor-generator, the second motor-generator applies a driving force to or retards an input or an output thereof.

7. The hybrid drivetrain according to claim 1, wherein the differential assembly is drivingly engaged with a third motor generator and the second motor generator.

8. The hybrid drivetrain according to claim 1, wherein the first motor generator assembly further comprises a secondary clutch, the secondary clutch drivingly engaged with the first motor generator and the electric axle drive unit.

9. The hybrid drivetrain according to claim 1, wherein the second motor generator comprises a gear box portion.

10. The hybrid drivetrain according to claim 9, wherein the gear box portion is one of an epicylic gearset and a gear train used to adjust a drive ratio.

11. The hybrid drivetrain according to claim 1, wherein the electric axle drive unit is drivingly engaged with the first motor generator assembly through a drive shaft.

12. The hybrid drivetrain according to claim 1, wherein the electric axle drive unit further comprises a gearbox, the gearbox drivingly engaged with the first motor generator and the second motor generator.

13. The hybrid drivetrain according to claim 12, wherein the gearbox is a fixed ratio gearbox in electrical communication with a controller.

14. The hybrid drivetrain according to claim 1, wherein the electric axle drive unit further comprises a secondary clutch, the secondary clutch drivingly engaged with the first motor generator and the electric axle drive unit for disengaging a portion of the electric axle drive unit from a remaining portion of the hybrid drivetrain.

15. The hybrid drivetrain according to claim 1, wherein the electric axle drive unit further comprises a third motor generator, a battery, and a controller, the battery and the controller are each in electrical communication with the first motor generator, the second motor generator, and the third motor generator, and wherein the second motor generator and the third motor generator are drivingly engaged with the first motor generator and the pair of wheel assemblies.

16. The hybrid drivetrain according to claim 15, wherein the electric axle drive unit includes a gearbox in driving engagement with the first motor generator.

17. The hybrid drivetrain according to claim 16, wherein the electric axle drive unit further comprises a secondary clutch in driving engagement with the gearbox and with the differential assembly, wherein the differential assembly is in selective driving engagement with the second motor generator and the third motor generator.

* * * * *